(12) United States Patent
Toda

(10) Patent No.: US 6,831,758 B1
(45) Date of Patent: Dec. 14, 2004

(54) IMAGE PROCESSING APPARATUS AND DATA PROCESSING APPARATUS

(75) Inventor: Hiromichi Toda, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,371

(22) Filed: Mar. 22, 2000

(30) Foreign Application Priority Data

Mar. 24, 1999 (JP) ............................................ 11-079602
Dec. 27, 1999 (JP) ............................................ 11-369938

(51) Int. Cl.$^7$ ................................................ H04N 1/00
(52) U.S. Cl. ..................................... 358/468; 358/440
(58) Field of Search ................................ 382/200, 202, 382/229; 345/619; 455/500; 358/440, 468, 443, 447, 462, 407; 379/100.01, 100.09, 100.12

(56) References Cited

U.S. PATENT DOCUMENTS

| | | | | |
|---|---|---|---|---|
| 4,201,978 A | * | 5/1980 | Nally .................. 340/146.3 C |
| 5,153,737 A | | 10/1992 | Kobayashi .................. 358/296 |
| 5,907,632 A | * | 5/1999 | Suzuki ........................ 382/187 |
| 6,460,763 B1 | * | 10/2002 | Yoshinaga et al. .......... 235/375 |
| 6,539,240 B1 | * | 3/2003 | Watanabe ................... 455/566 |

* cited by examiner

*Primary Examiner*—Jerome Grant, II
(74) *Attorney, Agent, or Firm*—Burns, Doane, Swecker & Mathis, L.L.P.

(57) ABSTRACT

In an image processing apparatus, a read section inputs image data of an original document including a plurality of character strings indicating document receivers. A control section extracts character strings from an image data of the document and recognizes the document receivers by the character string data. The control section converts the character string data in the image data such that a display format of a character string representing one receiver is different from a display format of character strings representing the other receivers, to thereby obtain new image data addressed to the individual receivers. This apparatus has a printing section, a communication section performing facsimile communications, and another communication section performing network communications, and the control section controls these sections such that for one receiver, one of these sections outputs the newly obtained image data addressed to this receiver.

15 Claims, 14 Drawing Sheets

Fig.12A
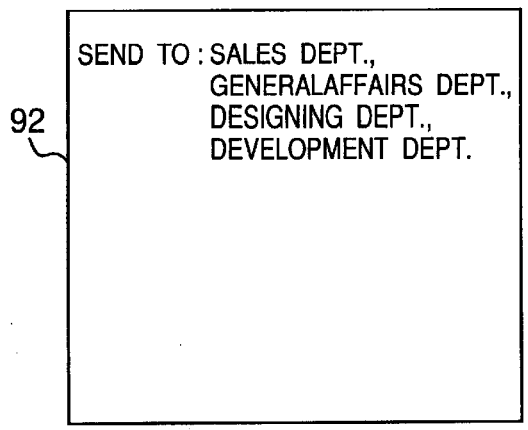
Fig.12B
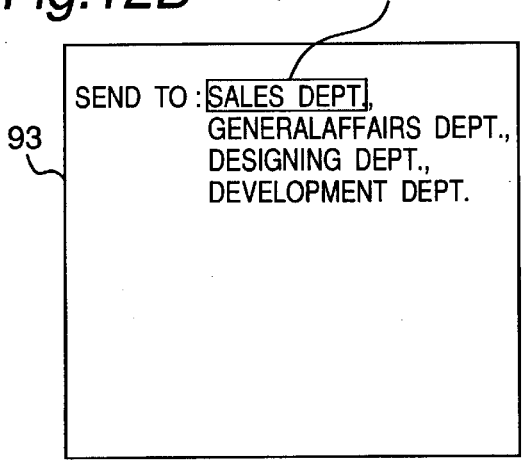
Fig.12C
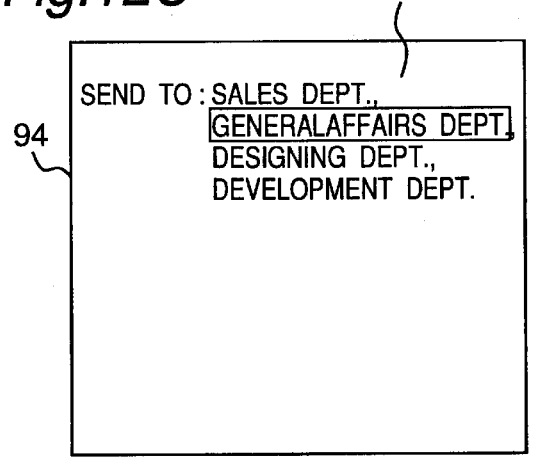
Fig.12D
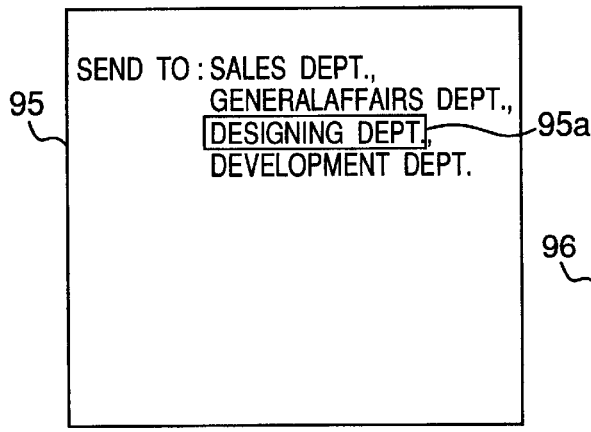
Fig.12E
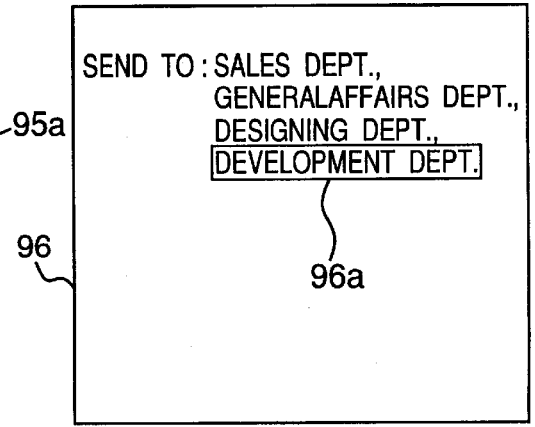

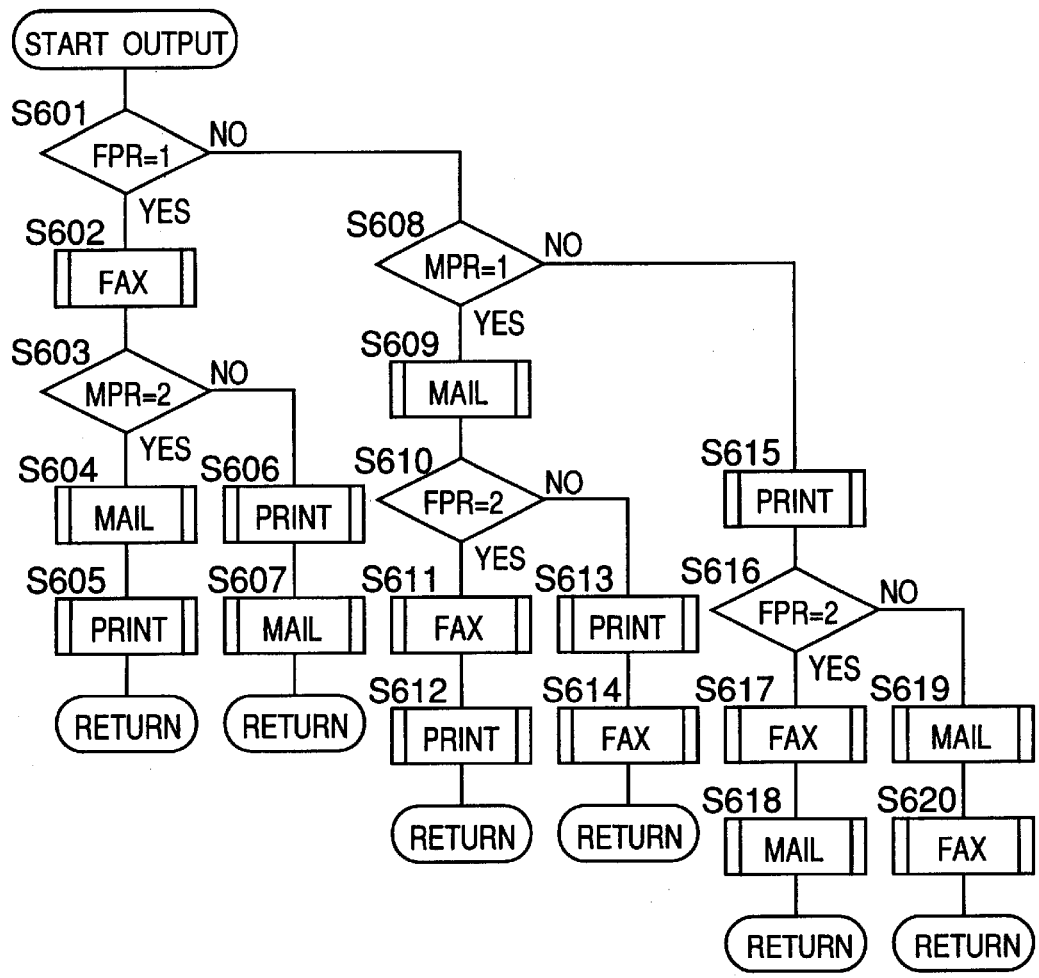

US 6,831,758 B1

IMAGE PROCESSING APPARATUS AND DATA PROCESSING APPARATUS

This application is based on applications Nos. 11-79602 and 11-369938 filed in Japan, the entire content of which is hereby incorporated by reference.

BACKGROUND OF THE INVENTION

The present invention generally relates to a data processing apparatus and an image processing apparatus. More particularly, the present invention relates to a data processing apparatus and an image processing apparatus executing data processing and image processing, respectively, adapted to sending electronic data or documents to a plurality of receiving ends.

When a document is sent to a plurality of its receivers (destinations) in a company, a person in charge takes a required number of copies of an original document with a copying machine. Then, the person writes names of the receivers on the copies one by one with a pen or sticks address tags to each copy. In another company, a receiver list prepared in advance is added to a cover page of an original document. After taking copies of the original document, a person in charge marks a particular receiver in the receiver list on each copy with a marker pen. Conventionally, due to such a manual work required, it takes a lot of time and labor to send documents to a plurality of departments or receiving ends. Further, copies taken from the same original document can be sent in excess to the same receiver by mistake or sent insufficiently. Moreover, there is a problem that copies are taken in excess, which means waste of resources such as paper.

There has been proposed a copying machine having an editing function which synthesizes a primary original document on which a receiver is not displayed and another auxiliary original document listing receivers, to generate copies containing an indication of a different receiver (for example, character strings such as "sales department", "general affairs department", and the like) (U.S. Pat. No. 5,153,737). However, in using the editing function-provided copying machine, it takes much time and labor to prepare the auxiliary original document listing the receivers. Further, because only one particular receiver (receiving department) among a plurality of intended receivers is displayed on each copy, it is impossible for the particular receiver to know whether copies of the same document have been sent to other associated departments.

SUMMARY OF THE INVENTION

It is an object of the present invention to provide a data processing apparatus and an image processing apparatus well adapted to send documents in the form of electronic data or paper to a plurality of receivers.

More particularly, it is an object of the present invention to provide a data processing apparatus and an image processing apparatus which can minimize a manual operation in preparing for sending same documents in the form of electronic data or paper to a number of receivers, so that these data and papers are simply and securely sent to the individual receiving ends.

It is also an object of the present invention to provide a data processing apparatus and an image processing apparatus allowing a receiver that has received a document in the form of electronic data or paper to easily know whether a same document has been sent to other receivers.

To achieve the objects, an image processing apparatus reflecting one aspect of the present invention comprises:

a recognizer recognizing, by referring character strings included in original image data of a document, a plurality of receivers to which the document should be sent; and a data processor generating modified image data from the original image data, the modified image data being for being addressed to a first receiver among the receivers and including character strings representing the receivers, wherein, in the modified image data, a display format of one of the character strings representing the first receiver is different from a display format of the character strings representing the remaining ones of the receivers.

The expression "display format" herein means a display format which can be altered, with the meaning (receiver) of the character string maintained. That is, for instance, the "display format" includes color (including density), font, font size, font style (e.g., inverted character, bold, italic, or the like), underline, surrounding line, half-tone dot meshing, addition of a symbol or a character, etc.

In this image processing apparatus, initially, by referring the character strings included in the original image data of the document, the recognizer recognizes a plurality of receivers to which the document should be sent. Then, the data processor generates modified image data from the original image data for the first receiver among the receivers. The modified image data includes character strings representing the receivers. In the modified image data, a display format of one of the character strings representing the first receiver is different from a display format of the character strings representing the remaining ones of the receivers. Thus, the modified image data exclusively directed or addressed to the first receiver is easily generated.

According to other aspect of the present invention, an image processing apparatus comprises:

a recognizer recognizing, by referring character strings included in original image data of a document, a plurality of receivers to which the document should be sent; and a data processor generating a plurality of sets of modified image data from the original image data, the plurality of sets of the modified image data being for being addressed to the receivers, respectively, each set of the modified image data including character strings representing the receivers, wherein, in each set of the modified image data, a display format of one of the character strings representing the respective one of receivers is different from a display format of the character strings representing the remaining ones of the receivers.

In the image processing apparatus having the above clarified construction, by referring character strings included in original image data of a document, the recognizer recognizes a plurality of receivers to which the document should be sent. Then, the data processor generates a plurality of sets of modified image data from the original image data, wherein the plurality of sets of the modified image data are for being addressed to the receivers, respectively. Each set of the modified image data includes character strings representing the receivers, and in each set of the modified image data, a display format of one of the character strings representing the respective one of receivers is different from a display format of the character strings representing the remaining ones of the receivers. Thus, a plurality of sets of modified data respectively directed or addressed to the receivers are easily generated, resulting in considerable reduction of time and labor of a manual operation which have conventionally been required in preparing documents to be individually sent to a plurality of receivers.

In one embodiment, the image processing apparatus further includes an output section outputting each set of the modified image data to the respective one of the receivers. Provision of the output section prevents copies of the document from being sent repeatedly to the same receiver by mistake. Also, provision of the output section prevents shortage of hard copies of the document. That is, a document can be reliably and correctly sent to the receivers, or receiving ends, such as company departments, to which it should be sent. Consequently, in outputting the image data as hard copy at a sending end or receiving ends, resources such as paper are prevented from being wastefully consumed. Further, because a character string in the modified image data representing a target receiving end has a display format different from character strings in the modified image data representing the other receiving ends, the target receiving end knows easily whether the document received by this receiving end is addressed to itself or not, and whether a document of the same content as the received one has been sent to other receiving ends.

In one embodiment, the output section includes a facsimile number storage storing facsimile numbers of the receivers, and a communication section dialing the facsimile numbers and thus sending each set of the modified image data to the respective one of the receivers through a telephone line.

In this embodiment, the communication section is connected with a telephone line with reference to a facsimile number stored in the facsimile number storage. Accordingly, in the case where a receiver has a facsimile number, it is possible to timely send the image data of the document to that receiver through the telephone line, with the display format of the character string indicating the receiver differentiated from those of other character strings. The facsimile apparatus at the receiving end connected with the image processing apparatus through the telephone line (facsimile line) outputs a copy of the received document in the form of paper, on which the character string indicating this receiver is indicated with the display format different from the display format of the character strings for the other receivers.

In one embodiment, the output section includes an address storage storing network communication addresses of the receivers, and a communication section addressing the network communication addresses and thus sending each set of the modified image data to the respective one of the receivers through a network line.

In this image processing apparatus, the network communication section is connected with a relevant network line with reference to the network communication address stored in the address storage. Accordingly, in the case where a receiver has a network communication address, it is possible to timely send the image data of the document to the receiver through the network line, with the display format of the character string indicating this receiver differentiated from that of the character strings for the other receivers. A printer at the receiving end connected with the image processing apparatus through the network line automatically or as necessary prints out the received image data on a sheet or sheets of paper, on which the character string indicating this receiver is indicated with the display format different from the display format of the character strings for the other receivers.

In one embodiment, the output section comprises different kinds of output devices, and these output devices have their respective preset priorities. For example, the output section includes an output device using facsimile communications and an output device using network communications. If the output device using network communications is given a higher priority than the output device using facsimile communications, a document is sent by the former output device, and not by the latter output device. Therefore, even if both network communications and facsimile communications are available in sending a document to one receiver, redundant sending of the same document is well avoided.

In one embodiment, the priorities of the output devices are changeable for each receiver. Accordingly, a document can be sent to each receiver by a sending method suited for each receiver.

According to still further aspect of the present invention, a data processing apparatus comprises:

a data processing unit, by referring information included in original data of a document, a plurality of receivers to which the document should be sent, and generating modified data from the original data, the modified data being for being addressed to a first receiver among the receivers, said modified data including first information representing the first receiver and second information representing the remaining ones of receivers, wherein a display format of the first information is different from a display format of the second information.

For example, the data processing apparatus may be a personal computer which is capable of sending HTML data files to the receivers through a network communications. In this case, destinations of the receivers or character strings representing the receivers may be included in the HTML data file, and a display format of one of the destinations or character strings may be differentiated from a display format of the destinations or character strings of the remaining ones of the receivers so that the intended receiver can easily realize the data file is directed to himself or herself.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12A, 12B, 12C, 12D, and 12E show examples of an original document and of its copies sent to each of receiving departments;

FIG. 14 shows the flow of a conversion of the output processing;

DETAILED DESCRIPTION OF THE PREFERRED EMBODIMENTS

Figure 1:
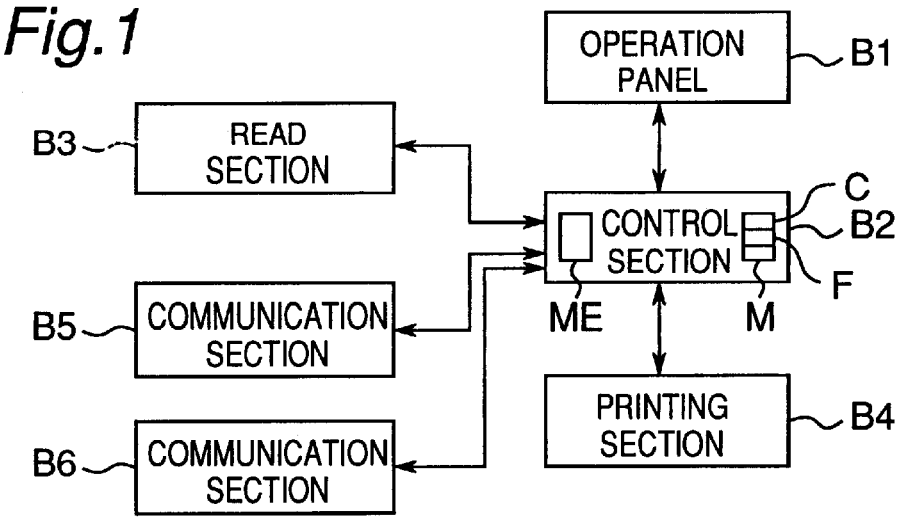
FIG. 1 is a schematic block diagram showing an image forming apparatus of an embodiment of the present invention.

FIG. 1 is a schematic block diagram showing a full color electrophotographic image forming apparatus according to an embodiment of the present invention. The image forming apparatus includes a control section B2 controlling the operation of the entire image forming apparatus, an operation panel B1 through which an operator performs input of various settings and commands such as a copy mode setting, start of a copying operation, and the like, a read section B3 inputting image data of an original document to the control section B2, a printing section B4 serving as an output device having a function of printing in colors of cyan, magenta, yellow, and black, a communication section B5 serving as an output device executing facsimile communications, and a communication section B6 serving as an output device executing network communications.

The control section B2 includes a microprocessor having a RAM and a ROM. The ROM stores software for controlling the image forming apparatus. The control section B2 executes the software program in the ROM by using a part of the RAM as a work area. The control section B2 incorporates an internal memory ME serving as both a facsimile number storage and an address storage. The facsimile number storage and the address storage store facsimile numbers and network communications addresses (i.e., E-mail addresses, which will be also referred to as merely "mail addresses"), respectively, of receivers to which a document should be distributed. The control section B2 has a counter C counting a total number of receivers to which documents of the same content should be distributed, a counter F counting a number of receivers to which the document should be sent via facsimile transmission, and a counter M counting a number of receivers to which the document should be sent by E-mail.

Figure 6A:
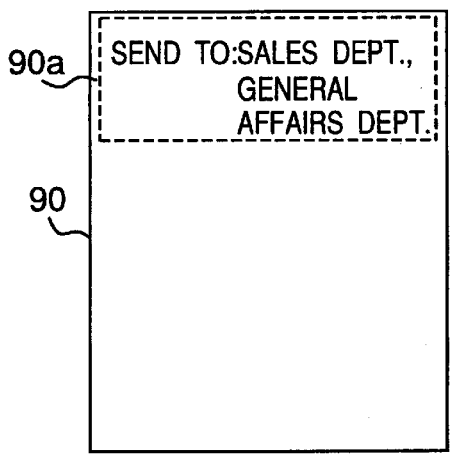
FIGS. 6A, 6B, and 6C show display examples of character strings indicating receivers on an original document.
Figure 6B:
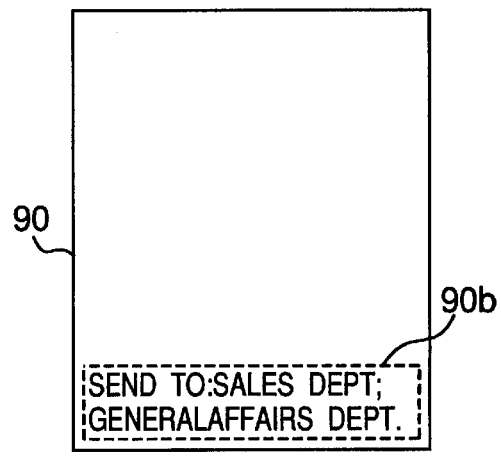
Figure 6C:
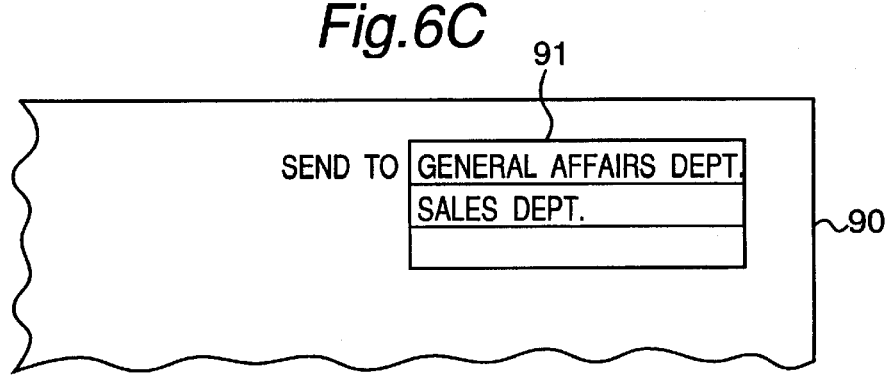

The read section B3 consists of a known image scanner. In the embodiment, the read section B3 optically reads the image of an original document including a plurality of character strings ("SALES DEPT.", "GENERAL AFFAIRS DEPT.", and the like) indicating receivers, as shown in FIGS. 6A, 6B, and 6C, and obtains image data of the original document. The read section B3 may be an interface circuit of a personal computer. In this case, the original document 90 is supplied as electronic data from the personal computer.

Figure 3:
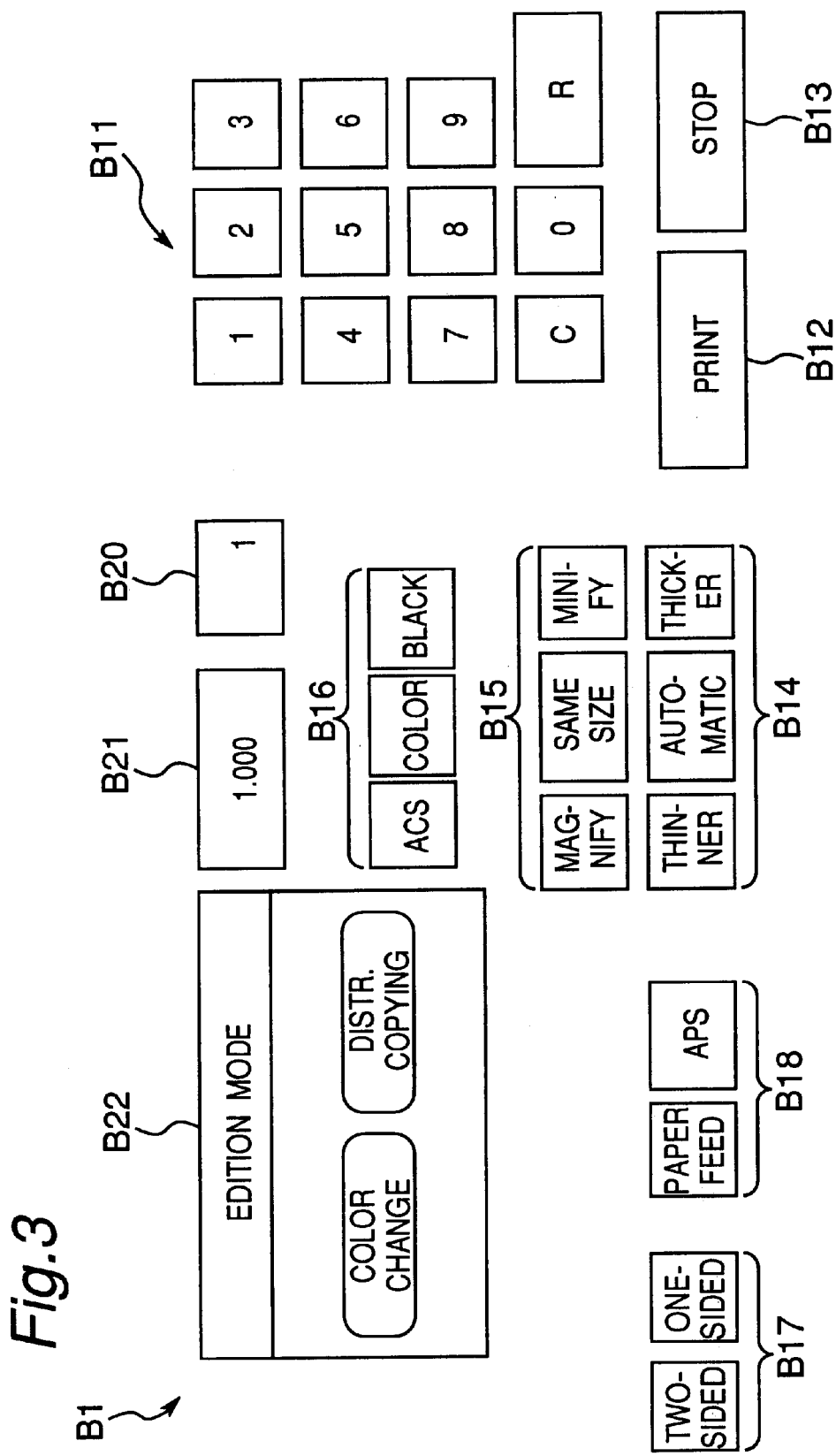
FIG. 3 shows an operation panel of the image forming apparatus.

FIG. 3 shows the construction of the operation panel B1 in detail.

In FIG. 3, a copy quantity setting section B11 consist of a group of keys for setting the number of copies or clearing (erasing) the set number of copies.

A print key B12 is a key by which start of a copying (printing) operation of the printing section B4 is instructed.

A stop key B13 is a key by which a copying (printing) operation is suspended while the operation is being performed.

A density setting key B14 consisting of three buttons is for adjusting the density at which an image is to be copied (printed).

A magnification setting key B15 consisting of three buttons is for setting a magnification at which an image is to be copied (printed).

A color mode selection key B16 consisting of three buttons is for setting whether an image is to be printed in full color or in only black.

A one/two-sided print key B17 consisting of two buttons is for setting whether an image is to be printed on one side or two sides of a copy paper.

A cassette selection key B18 consisting of two buttons is for selecting one of four paper feed cassettes (which is described later) to thereby select copy paper.

A copy quantity display B20 displays the number of copies set by the copy quantity setting section B11, and also displays the balance of copies during a copying (printing) operation.

A magnification display B21 displays a magnification set by the magnification setting key B15.

A touch panel-type liquid crystal display B22 displays various pieces of information such as copy modes and the state of the image forming apparatus, and also displays touch keys to be pressed by an operator to set various copy modes.

Figure 4:
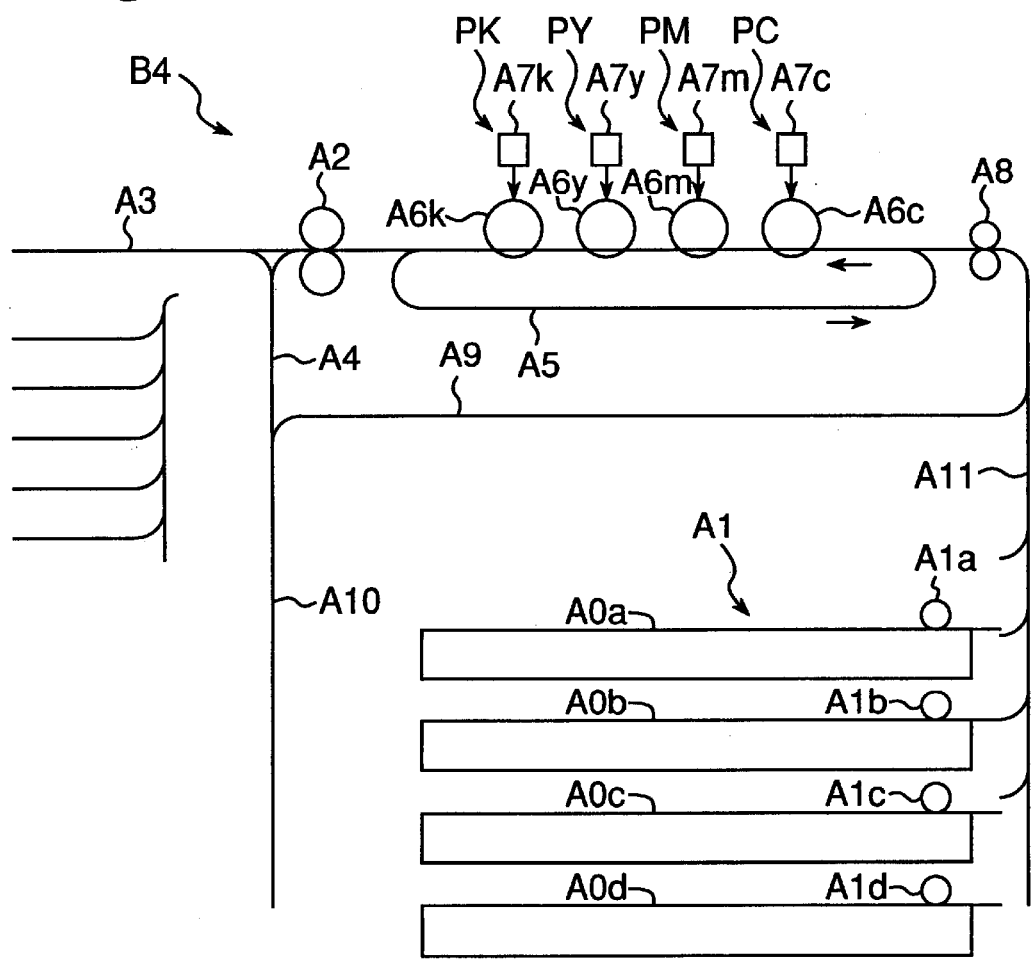
FIG. 4 shows the construction of a printer section of the image forming apparatus.

FIG. 4 shows the construction of the printing section B4 in detail.

The printing section B4 includes a paper feeder A1 for feeding out paper from paper cassettes A0a, A0b, A0c, and A0d. This section B4 also includes an image-forming unit PC disposed above the paper feeder A1 and forming an image in cyan (C), an image-forming unit PM disposed adjacent to the image-forming unit PC and forming an image in magenta (M), an image-forming unit PY disposed adjacent to the image-forming unit PM and forming an image in yellow (Y), and an image-forming unit PK disposed adjacent to the image-forming unit PY and forming an image in black (K). The printing section B4 also includes a fixing unit A2 disposed at the left-hand side of the image-forming units, as viewed in FIG. 4, and a sorter A3 disposed on left-hand side of the fixing unit A2 in FIG. 4.

The paper feeder A1 has the paper cassettes A0a, A0b, A0c, and A0d accommodating paper of different sizes, respectively. When a paper feed roller A1a, A1b, A1c or A1d is driven under the control of the control section B2 (FIG. 1), sheets of copy paper are fed one by one to a transport path A11 from an associated paper cassette A0a, A0b, A0c, or A0d. The paper fed out to the transport path A11 is then supplied to an endless transfer belt A5 at a predetermined timing through timing rollers A8.

The transfer belt A5 is driven in a direction shown with arrows of FIG. 4 to pass the supplied paper through the image-forming units PC, PM, PY, and PK sequentially.

The image-forming units PC, PM, PY, and PK are of a known electrophotographic type, and have a photosensitive drum A6c and an image exposure device A7c, a photosensitive drum A6m and an image exposure device A7m, a photosensitive drum A6y and an image exposure device A7y, and a photosensitive drum A6k and an image exposure device A7k, respectively.

Each of the image exposure devices A7c, A7m, A7y, and A7k receives an electric digital image signal from the control section B2 and irradiates the surface of the photosensitive drums A6c, A6m, A6y, and A6k, respectively, with laser beams modulated in correspondence to the electric digital image signal to form an electrostatic latent image thereon.

Although not shown in the drawings, in the periphery of each of the photosensitive drums A6c, A6m, A6y, and A6k, there are provided an electrification charger for uniformly electrifying the associated photosensitive drum A6c, A6m, A6y, or A6k, a developing unit for developing an electrostatic latent image formed on the surface of the associated photosensitive drum, a transfer charger for transferring a toner image to paper, and a cleaner for removing toner remaining on the surface of the photosensitive drum. The developing units of the image-forming units PC, PM, PY, and PK contain cyan toner, magenta toner, yellow toner, and black toner, respectively.

By a known electrophotographic process, the image-forming units PC, PM, PY, and PK sequentially transfer a toner image of cyan (C), a toner image of magenta (M), a toner image of yellow (Y), and a toner image of black (K) to a sheet of copy paper being fed by the transfer belt A5.

After the toner images are transferred to the copy paper, the fixing unit A2 fixes the toner images thereto as an image. In the one-sided copy mode, the image-fixed paper is discharged to the sorter A3. In the two-sided copy mode, by a paper inverter A4, the copy paper is fed back to the timing rollers A8 through a switch-back transport path A10 and an inversion circulation path A9 to take a copy on the rear surface of the copy paper. Then, by the electrophotographic process, an image is formed on the rear surface of the copy paper.

Figure 2:
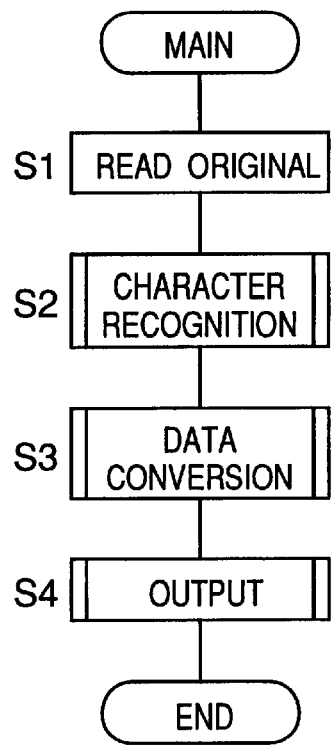
FIG. 2 shows a main flow of a processing performed in a distribution copying mode of the image forming apparatus.

When a person (operator) selects an edition mode through the touch panel liquid crystal display B22 and presses a displayed distribution copying key, the control section B2 of the image forming apparatus executes software processing for the distribution copying mode as shown in FIG. 2.

(1) At step S1 of FIG. 2, when the print key B12 is pressed, the control section B2 sends a start signal to the read section B3. Upon receipt of the start signal, the read section B3 optically reads the image of an original document 90 having a plurality of character strings indicating receivers (for example, "SEND TO", "SALES DEPT.", "GENERAL AFFAIRS DEPT.", etc. as shown in FIGS. 6A, 6B, and 6C) and obtains the image data of the original document.

Generally, the character strings indicating the receivers are disposed at an upper portion 90a of the original document 90, as shown in FIG. 6A or at a lower portion 90b thereof, as shown in FIG. 6B.

The character strings indicating the receivers have the following characteristics:
 i) They have almost the same character size.
 ii) They are punctuated with a punctuation mark ",", or a symbol such as a semicolon ";", or a ruled line 91 as shown in FIG. 6C.
 iii) They are arranged in the periphery of a character string "SEND TO:" or "SEND TO".

Figure 5:
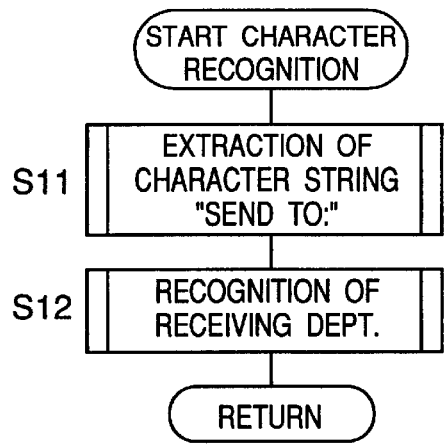
FIG. 5 shows the flow of character recognition processing performed in the distribution copying mode.

(2) At step S2, the control section B2 operates as a recognizer and executes character recognition processing. As shown in FIG. 5, the character recognition processing consists of a processing of extraction of character string "SEND TO:" (step S11) and a processing of recognition of receiving department (step S12).

Figure 7:
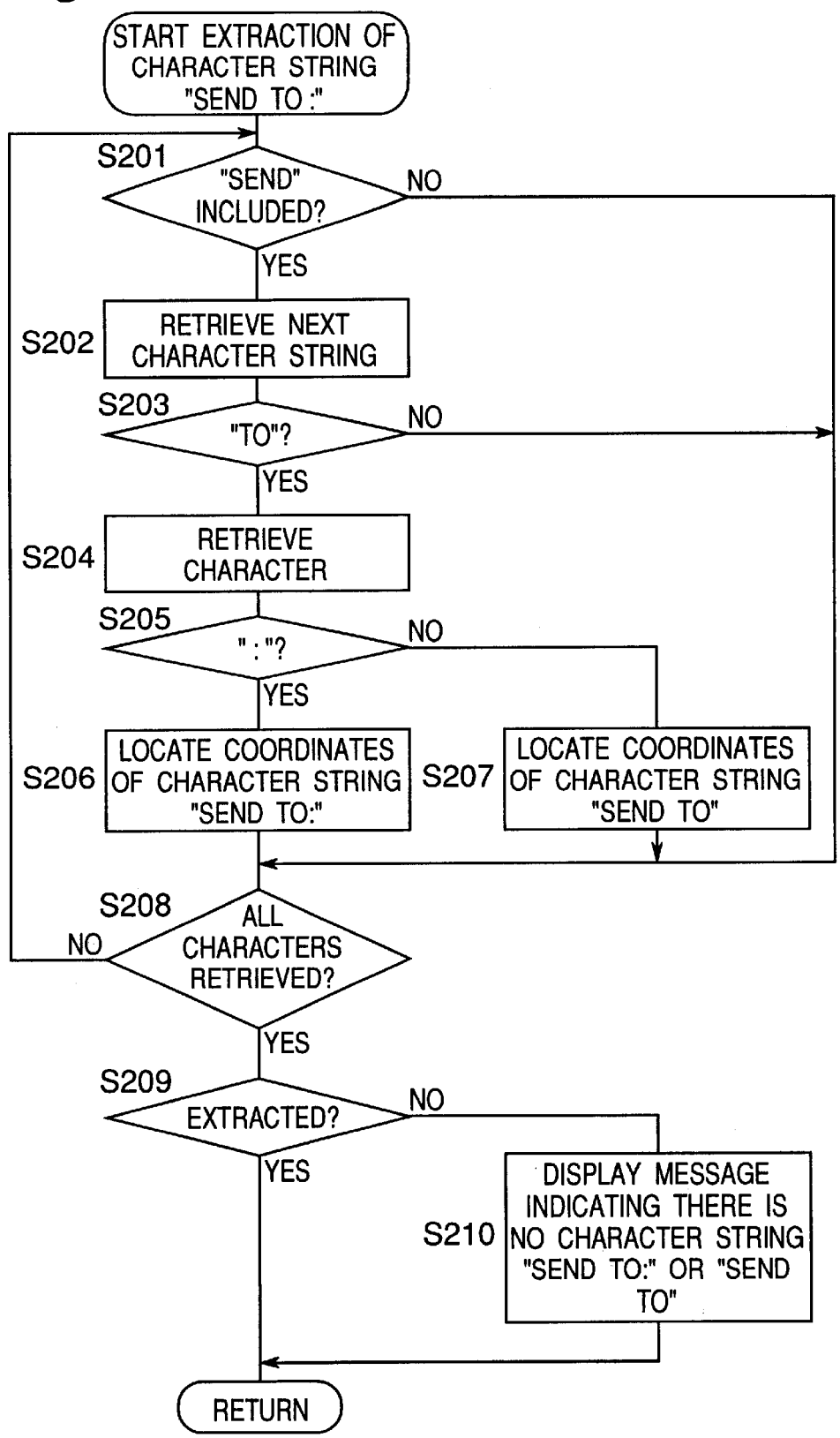
FIG. 7 shows the flow of processing of extraction of a character string "SEND TO:" performed in the character recognition processing.

FIG. 7 shows a flowchart for the processing of extraction of character string "SEND TO:" (step S11), which is a processing to extract the character string "SEND TO:" or "SEND TO" from the obtained image data of the original document 90.

More specifically, at step S201, the image data of the original document 90 is searched for a character string "SEND" and it is discriminated whether the image data has the character string "SEND". As described above, the character string indicating the receiver is typically disposed at the upper portion 90a of the original document 90 or at its lower portion 90. In consideration of this, a part of the image data corresponding to the upper portion or lower portion of the original document 90 may be searched first. If the search result is that the image data of the original document 90 does not have the character string "SEND", then the image data may be entirely searched. The time period required for retrieval of the character string can be thereby shortened.

If it is determined at step S201 that the image data of the original document 90 has the character string "send", the program goes to step S202 at which a subsequent character string is retrieved. At step S203, it is determined whether the subsequent character string is "to". If yes, the program goes to step S204 at which a subsequent character is retrieved. At step S205, it is determined whether the subsequent character is ":". If yes, it follows that the image data has a character string "SEND TO:". Then, the program goes to step S206 at which coordinates indicating the position of the character string "SEND TO:" in the image data are located. On the other hand, if it is determined at step S205 that the character is not ":", then, the program goes to step S207 at which coordinates indicating the position of a character string "SEND TO" are located in the image data.

After completion of retrieval of all characters (step S208), it is determined at step S209 whether the character string "SEND TO:" or "SEND TO" has been successfully extracted or not. If yes, the program returns. If no, the program goes to step S210 at which an indication to the effect that there is no character string "SEND TO:" or "SEND TO" is displayed on the liquid crystal display B22.

The character strings indicating the receivers are typically provided on a first page or a last page of a document. Thus, in the case where an original document is constituted of a plurality of sheets, it is not necessary to search all pages but only the first and last pages. The search time is thereby reduced.

Although the character string "SEND TO:" or "SEND TO" is extracted in this embodiment, other character strings such as "COPY", "CC", "DISTRIBUTE", and the like may be extracted in a similar procedure, instead of "SEND TO:" or "SEND TO". Further, in performing character recognition, the characters may be converted into character codes and retrieval may be performed.

Figure 8:
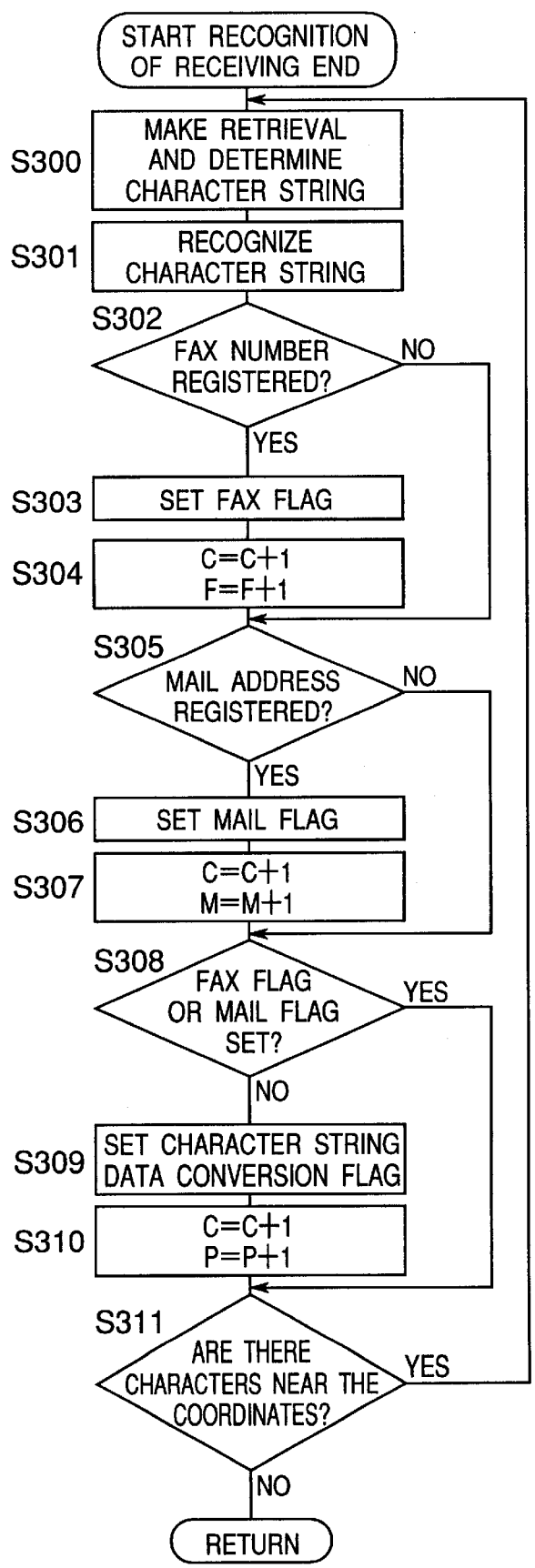
FIG. 8 shows the flow of a processing of recognition of receiving department performed in the character recognition processing.

FIG. 8 is a flowchart for the processing of recognition of receiving end (step S12 in FIG. 5). This processing is executed to recognize receiving ends or receivers (receiving departments in the embodiment) indicated by the character strings arranged in the periphery of the character string "SEND TO:" or "SEND TO". The following counters are used in the receiving end recognition processing: the counter C counting a total number of receivers to which copies of a document should be distributed in the form of paper or electronic data, the counter F counting receivers to which data of the document is sent by facsimile (referred to as simply "facsimile receivers"), the counter M counting receivers to which data of the document is sent by E-mail (referred to as simply "E-mail receivers"), and a counter P counting receivers to which hard copies of the document, made by the printing section B4, with the character string data converted, are distributed (referred to as simply "print receivers").

More specifically, at step S300, the periphery of the character string "SEND TO:" or "SEND TO" is searched to determine character strings indicating the receiving departments. Because the character strings indicating the receiving departments are punctuated with the punctuation mark "," or a symbol such as semicolon ";", or the ruled line, as described previously, they are made definite by each punctuation.

When one character string (receiving department) is made definite or determined, the program goes to step S301 at which this character string indicating the receiving department is recognized, and the recognized character string (receiving department) is displayed on the liquid crystal display B22 (FIG. 3) of the operation panel B1.

Then, at step S302, the internal memory ME of the control section B2 is searched to determine whether a facsimile number of the receiving department has been registered in the memory ME. If yes, at step S303, a FAX flag indicating that a facsimile transmission should be performed for the receiving department is set. Then, at step S304, the counter C indicating the total number of receivers is incremented by 1 (+1), and the counter F indicating the number of facsimile receivers is incremented by 1. Also, the value of each of the counters C and F is displayed on the liquid crystal display B22.

Similarly, the internal memory ME of the control section B2 is searched and it is determined whether an E-mail address of the receiving department has been registered in the memory ME. If yes, at step S306, a mail flag indicating that an E-mail transmission should be executed for the receiving department is set. Then, at step S307, the counter C indicating the total number of receivers is incremented by one, and the counter M indicating the number of E-mail receivers is incremented by one. Also, the value of each of the counters C and M is displayed on the liquid crystal display B22.

Then, at step S308, it is determined whether the FAX flag or the mail flag has been set. If the FAX flag or the mail flag is determined to have been set at step S308, then, the program goes to step S311. On the other hand, if the FAX flag or the mail flag is determined to have not been set at step S308, then, the program goes to step S309 at which a character string data conversion flag is set. The character string data conversion flag indicates that when a copying operation is executed by the printer section B4, the display format of the character string of the relevant receiving department should be changed so that it differs from the display format of the remaining character strings. The "display format of character string" refers to a display format which can be altered in various ways, with the meaning (receiver) indicated by the character string maintained. That is, the "display format of character string" includes color (including density), font, font size, font style (for example, inverted character, bold character, oblique character, and the like), addition of underline, surrounding line, half-tone dot mesh, a symbol (such as *) or a character to the character string. Then, at step S310, the counter C counting the total number of receivers is incremented. Further, at step S310, the counter P counting the number of print receivers is incremented by one, and the value of each of the counters C and P is displayed on the liquid crystal display B22.

Then, at step S311, the image data is searched at the periphery of the previous character string indicating the receiving department. If it is determined at step S311 that there is another character string, which indicates a subsequent receiving department, the program returns to step S300 at which the current character string is retrieved and made definite. Then, the processing of step S301 to S310 is repeated.

As described above, because a character string (receiving department) is displayed each time the character string is made definite, receiving ends do not fail to be determined. By setting a registration mode, it is possible for the operator to register the facsimile number and/or the mail address of a receiving department, if any, when the receiving department is made definite. Values of the counters F, M, and P are displayed at steps S304, S307, and S310, respectively, along with a value of the counter C. Thus, the operator can confirm the quantity of distribution, or the number of copies to be sent, based on the display content.

Figure 9:
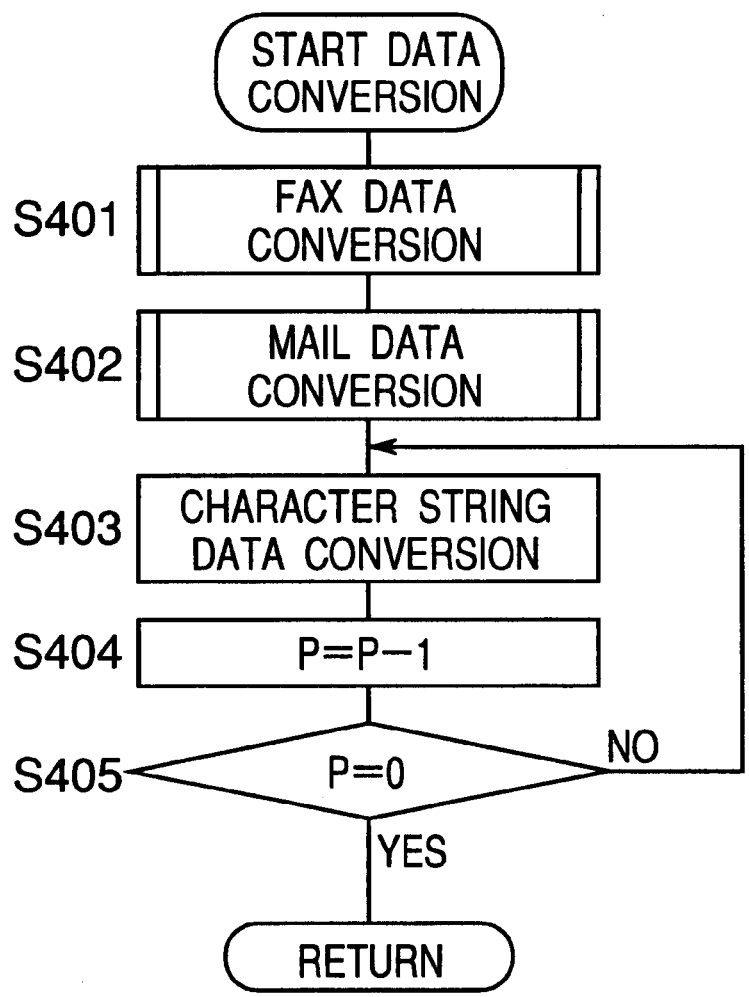
FIG. 9 shows the flow of data conversion processing performed in the distribution copying mode.

(3) At step S3 shown in FIG. 2, the control section B2 operates as a data converter and executes a data conversion processing. The data conversion processing is a processing of extracting a receiving department recognized by the character recognition processing (step S2) and modifying the image data to change the display format of the character string indicating the extracted receiving department with respect to the display format of the other character strings. As shown in FIG. 9, the data conversion processing includes facsimile data conversion processing (step S401) of modifying image data to be sent by facsimile, mail data conversion processing (step S402) of modifying image data to be sent by E-mail, and print data conversion processing (steps S403–S405) of modifying image data to be copied by the printer section B4.

Figure 10B:
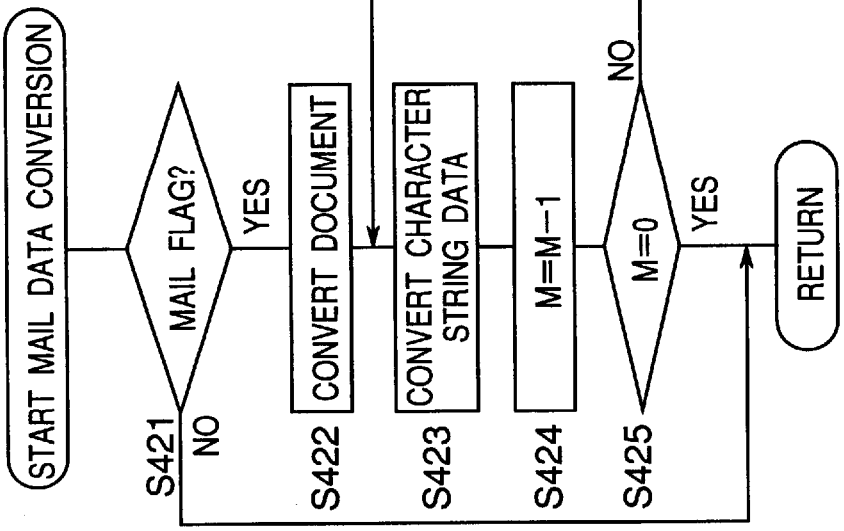
FIGS. 10A and 10B show the flows of facsimile data conversion processing and mail data conversion processing in the data conversion processing.
Figure 10A:
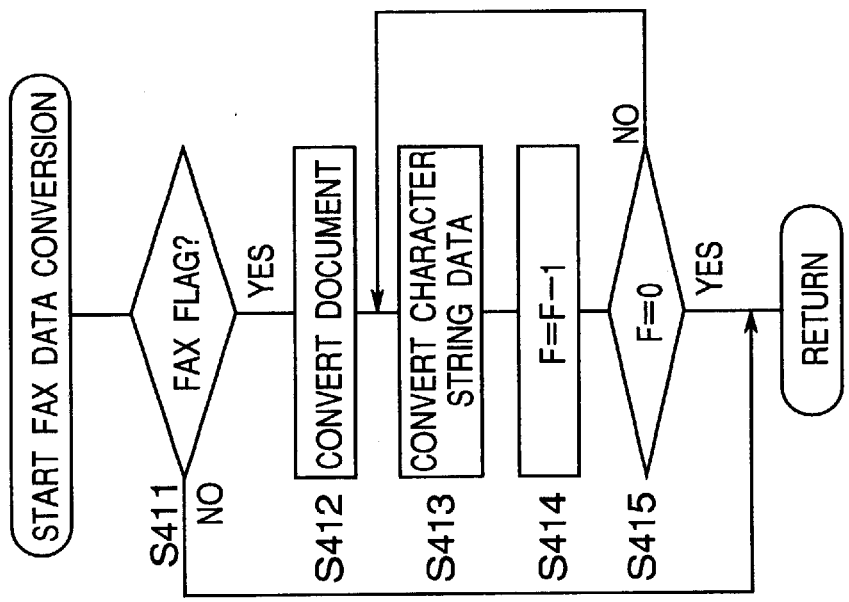

FIG. 10A shows details of the facsimile data conversion processing performed at step S401 of FIG. 2. At step S411 of FIG. 10A, the memory ME is searched and it is determined whether the FAX flag has been set for any one of the receiving departments. If yes, the program goes to step S412 at which document conversion processing such as data compression is executed for facsimile transmission. Then, at step S413, one of the receiving departments to which facsimile transmission is executed is extracted, and character string data is converted. That is, of the image data resulting from conversion of the document, the display format of the character string indicating the receiving department is changed such that the changed display format differs from the display format of the remaining character strings. The new image data obtained in this way is stored in the RAM in a manner associated with the receiving department. Then, at step S414, the counter F indicating the number of facsimile receivers is decremented by one (−1). Then, at step S415, it is determined whether the value of the counter F has become 0. If no, it follows that there are still receiving departments for which facsimile communication should be executed, and the program returns to step S413. At step S413, another receiving department for which the FAX flag has been set is extracted, and changing of the character string data is performed to differentiate the display format of the currently extracted receiving department from the display format of the other receiving departments. In this manner, the process of changing character string data (step S413) is repeatedly executed until the value of the counter F becomes 0 at step S415.

FIG. 10B shows details of the mail data conversion processing performed at step S402 of FIG. 2. Initially, at step S421 of FIG. 10B, the memory ME is searched and it is determined whether the mail flag has been set for any one of the receiving departments. If yes, the program goes to step S422 at which the document conversion processing such as data compression is executed for E-mail transmission. Then, at step S423, a receiving department for which the E-mail transmission is executed is extracted, and the character string data change is executed. That is, of the image data resulting from conversion of the document, the character string indicating the receiving department is changed such that its display format differs from the display format of the other character strings. The image data modified through the above process is stored in the RAM in association with the relevant receiving department. Then, at step S424, the counter M indicating the number of E-mail receivers is decremented by one (−1). Then, at step S425, it is determined whether the value of the counter M has become 0. If no, it follows that there still remain receiving departments for which the facsimile transmission should be executed, and the program returns to step S423. Then, another receiving department is extracted, and the character string data for the currently extracted receiving department is changed. In this manner, the processing of changing character string data is repeatedly executed until it is determined at step S425 that the value of the counter M becomes 0.

Thereafter, at steps S403–S405 of FIG. 9, the print data conversion process is executed to modify image data to be copied by the printing section B4. That is, at step S403, one of receiving departments to which a copy of the original document 90 should be sent in a way other than by facsimile or E-mail is extracted from the image data of the document 90, and the processing of changing character string data in the image data is executed to change the display format of the character string indicating the currently extracted receiving department with respect to the display format of the character strings indicating the other receiving departments, as in the FAX data conversion process and the mail data conversion process. Then, at step S404, the counter P indicating the print receivers is decremented by one (−1). Then, at step S405, it is determined whether the value of the counter P has become 0. If no, the program returns to step S403 because there still remain receiving departments to which a copy of the original document should be sent. At step S403, another receiving department is extracted from the image data, and the character string data changing processing is executed again. In this manner, the character string data changing processing (step S403) is repeatedly executed until it is determined at step S405 that the value of the counter P becomes 0.

Figure 11A:
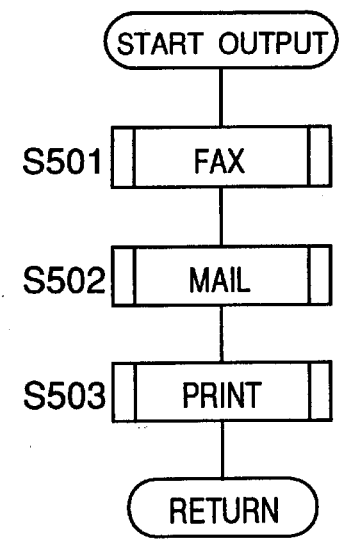
FIG. 11A shows the flow of output processing in the distribution copying mode.

(4) Then, at step S4 shown in FIG. 2, the control section B2 executes output processing. The output processing is a processing of outputting image data subjected to data conversion (step S3) to each receiver recognized in the character recognition processing (step S2). As shown in FIG. 11A, the output processing includes FAX processing (step S501) of executing facsimile sending/receiving through the communication section B5, mail processing (step S502) of executing E-mail sending/receiving through the communication section B6, and print processing (step S503) of executing a copying operation by the printing section B4.

Figure 11B:
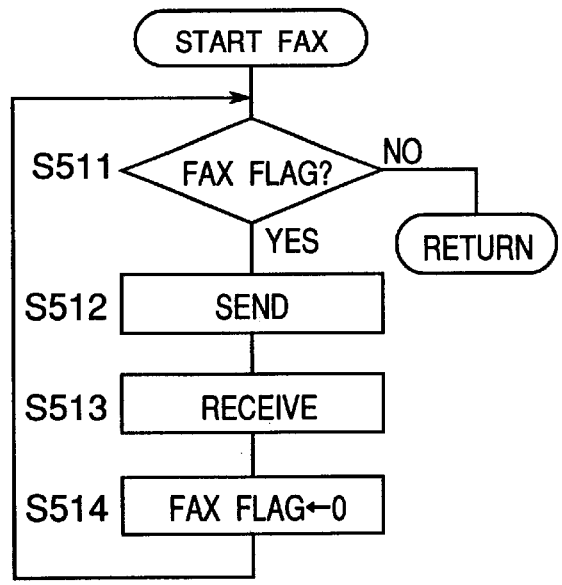
FIGS. 11B, 11C, and 11D show the flows of facsimile, mail and print processings performed in FIG. 11A, respectively.

FIG. 11B shows details of the FAX processing performed at step S501 of FIG. 11A. In the FAX processing, initially at step S511, the memory ME is searched for the receiving departments and it is determined, for each receiving department, whether the FAX flag has been set or not, to determine whether facsimile sending/receiving should be executed or not. If the FAX flag has been set for a receiving department (YES side at step S511), the control section B2 executes a facsimile output control to transmit the character string data-changed image data for the receiving department, stored in the RAM, to the receiving department through the communication section B5 at step S512. At step S513, the control section B2 receives necessary data by return from the receiving department. Then, at step S514, the FAX flag for this receiving department is reset. Then, the program returns to step S511. At step S511, another receiving department for which the FAX flag has been set is searched for. Depending on the search result, control is made as to whether another facsimile sending/receiving is executed. Owing to the above processing, it is possible to sequentially send through the communication section B5 to different receivers the image of the original document 90 with the character string indicating a true receiving department changed in display format such that the true receiving department is distinguished from the other receiving departments.

Figure 11C:
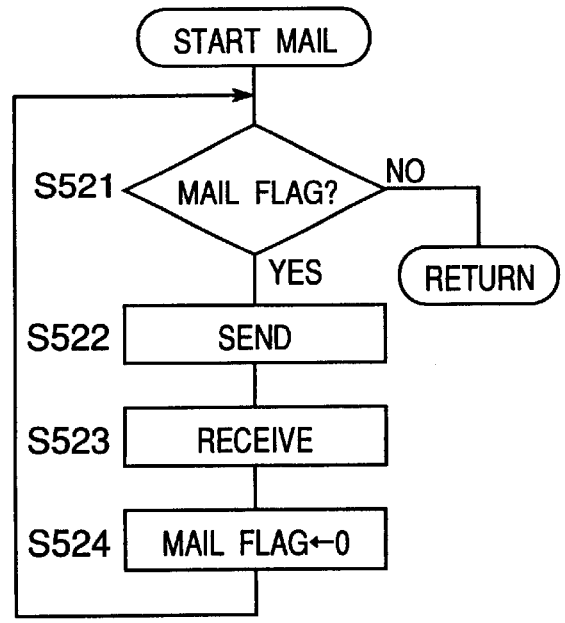

FIG. 11C shows details of the mail processing performed at step S502 of FIG. 11A. In the Mail processing, initially at step S521, the memory ME is searched for the receiving departments, and it is determined, for each receiving department, whether the mail flag has been set or not, to determine whether E-mail sending/receiving should be executed or not. If the mail flag has been set for a receiving department (YES side at step S521), the control section B2 executes a mail communications control to transmit the character string data-changed image data for the receiving department, stored in the RAM, to the receiving department through the communication section B6 at step S522. At step S523, the control section B2 receives necessary data by return from the receiving department. Then, at step S524, the mail flag for this receiving department is reset. Then, the program returns to step S521. At step S521, another receiving department for which the mail flag has been set is searched for. Depending on the search result, control is made as to whether another E-mail sending/receiving is executed. Owing to the above processing, it is possible to sequentially send through the communication section B6 to different receivers the image of the original document 90 with the character string indicating a true receiving department changed in display format such that the true receiving department is distinguished from the other receiving departments.

Figure 11D:
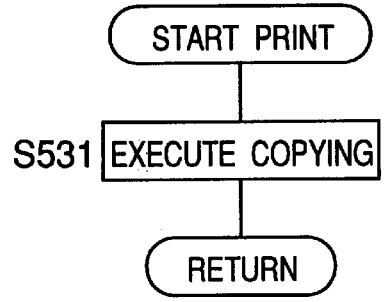

Thereafter, the printing section B4 executes printing processing at step S503 of FIG. 11A. As shown in FIG. 11D, in the printing process, the control section B2 controls the printing section B4 to print characters on paper. That is, at step S531 of FIG. 1D, based on image data obtained by the print data conversion processing (steps S403–S405), hard copies are made for receivers other than facsimile and mail receivers, using paper accommodated in any one of the paper cassettes A0a, A0b, A0c, and A0d.

The image forming apparatus of this embodiment operates as described above. Thus, the manual operation required of a person in charge, or an operator, is only to send the copies produced by the printer section B4 to receivers printed thereon in a display format different from that of the other receivers. Therefore, in sending the hard copies to different receivers, the person in charge need not perform a manual operation for distinguishing one receiver from the other receivers printed on the copies, such as marking the name of the receiver with a color pen. Further, it does not occur that extra copies of a document are unnecessarily sent to the same receiver by mistake or that there is a shortage of hard copies. That is, the document can be reliably sent to departments to which it should be sent. Consequently, it is possible to prevent resources such as paper from being wastefully consumed.

If an original document 92 has data shown in FIG. 12A, that is, a copy of the document 92 is sent to a sales department, a general affairs department, a designing department, and a development department, then the copies of the document 92 received by these departments are as shown in FIGS. 12B, 12C, 12D, and 12E, respectively. As is obvious from these figures, of all the character strings "SALES DEPT.", "GENERAL AFFAIRS DEPT.", "DESIGNING DEPT," and "DEVELOPMENT DEPT." on a copy, only one character string indicating a relevant department which has received the copy is displayed in a different mode from the other character strings. Specifically, the character strings surrounded with frames 93a, 94a, 95a, 96a shown in FIGS. 12B, 12C, 12D, and 12E, respectively are different in the display format from the other character strings. Accordingly, seeing the display of the remaining receivers on a document 93, the sales department, which has received the document 93, can easily know that a document of the same content (although display formats of the receiving departments are different) 94, 95, 96 as that of the received one has been sent to the general affairs department, the designing department, and the development department as well.

Figure 13A:
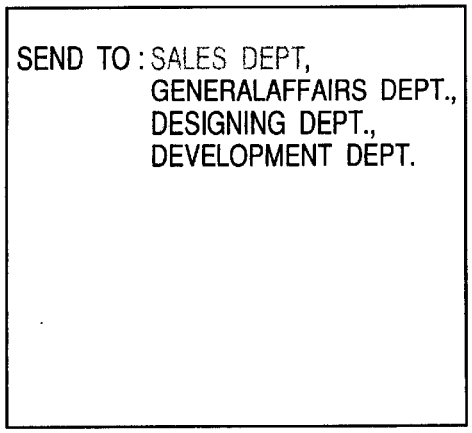
FIGS. 13A, 13B, 13C, 13D, 13E, 13F, 13G, 13H, and 13I show various examples in which the display format of a character string "SALES DEPT." is different from the display format of character strings "GENERAL AFFAIRS DEPT.", "DESIGNING DEPT.", and "DEVELOPMENT DEPT."
Figure 13B:
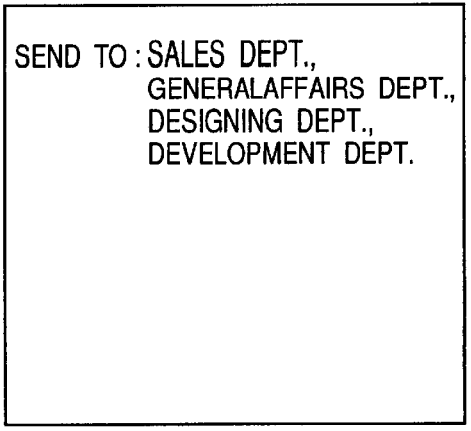
Figure 13C:
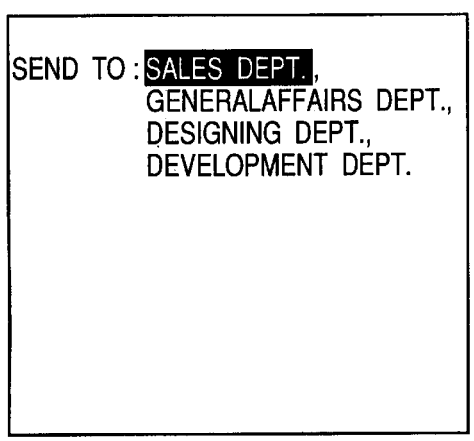
Figure 13D:
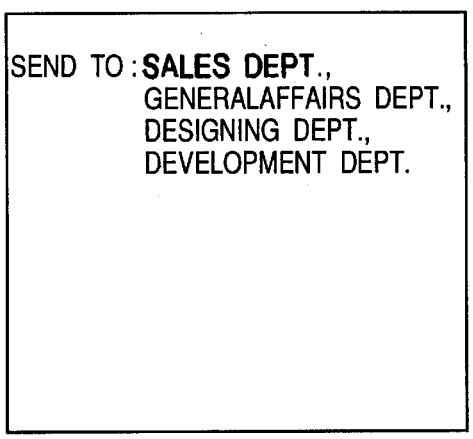
Figure 13E:
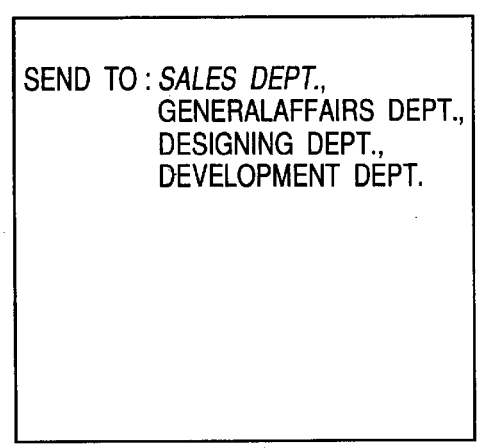
Figure 13F:
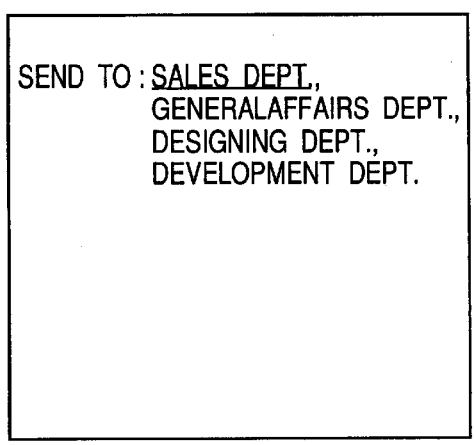
Figure 13G:
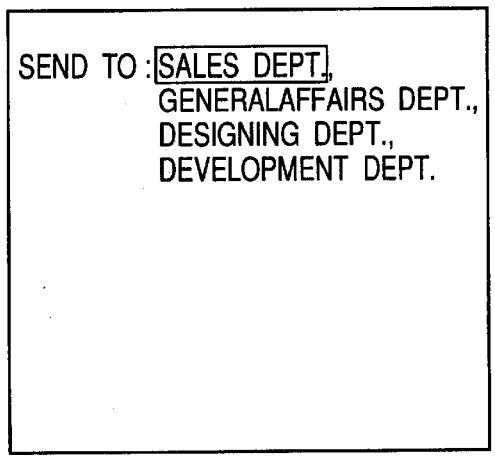
Figure 13H:
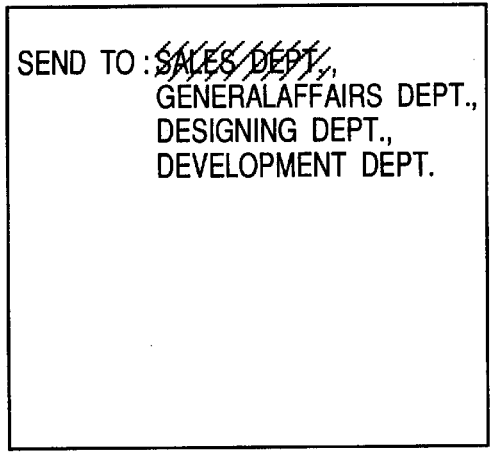
Figure 13I:
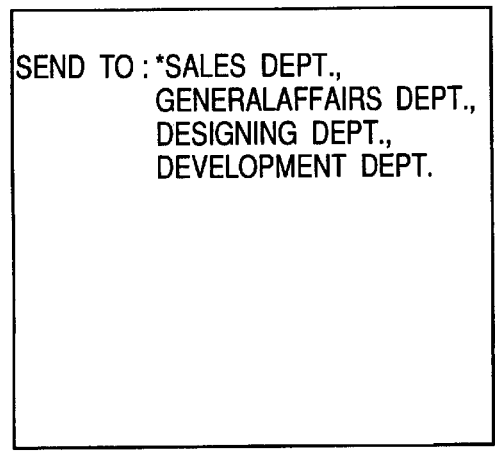

FIGS. 13A–13I show various examples in which the display format of the character string "SALES DEPT." is different from the display format of the character strings indicating the other departments, "GENERAL AFFAIRS DEPT.", "DESIGNING DEPT." and "DEVELOPMENT DEPT." In the example shown in FIG. 13A, the color of the character string "SALES DEPT." is brighter than that of the character strings indicating the other departments. In the example shown in FIG. 13B, the font size of the character string "SALES DEPT." is larger than that of the character strings indicating the other departments. In the example shown in FIG. 13C, the character string "SALES DEPT." is inverted so as to be displayed in white against a black background, whereas the character strings indicating the other departments remain unchanged to be displayed in black against a white background. In the example shown in FIG. 13D, the character string "SALES DEPT." is displayed with boldface, whereas the character strings indicating the other departments are displayed in a normal thickness. In the example shown in FIG. 13E, the character string "SALES DEPT." is displayed with italic characters, whereas the character strings indicating the other departments are not displayed with italic characters. In the example shown in FIG. 13F, the character string "SALES DEPT." is underlined, whereas the character strings indicating the other departments are not underlined. In the example shown in FIG. 13G, the character string "SALES DEPT." is surrounded with a line, whereas the character strings indicating the other departments are not surrounded with a line. In the example shown in FIG. 13H, half-tone dot mesh is applied to the character string "SALES DEPT.", whereas the half-tone dot mesh is not applied to the character strings indicating the other departments. In the example shown in FIG. 13I, a symbol * is attached to the upper left side of the character string "SALES DEPT.", whereas the symbol * is not attached to the character strings indicating the other departments. In any of the examples, when a person sees these documents, the person can easily recognize that the display format of the character string "SALES DEPT." is different from that of the character strings for the other departments. Accordingly, the person can send the document to the sales department securely. Further, the sales department that has received the document knows easily that a same document as the received one has been sent to the other departments (general affairs department, designing department, and development department).

In the above embodiment, the character strings are mainly made up of uppercase letters. Alternatively, lowercase letters may be used. In any case, the control section is designed to recognize the receiving ends.

FIG. 14 shows a flow of a modification of the output processing (step S4 of FIG. 2). This output processing presupposes that priorities are assigned in advance to the facsimile processing shown in FIG. 11B, the mail processing shown in FIG. 11C, and the print processing shown in FIG. 11D by an operator's key input through the operation panel B1. In order to preset such priorities, the image forming apparatus has a FAX priority register FRP storing the priority of the facsimile processing, a mail priority register MPR storing the priority of the mail processing, a print priority register PPR storing the priority of the print processing. The registers hold the preset priorities 1, 2, and 3 (A lower number indicates a higher priority.)

In the output processing, initially at step S601, with the FAX priority register FRP checked, it is determined whether the priority of the facsimile processing is 1 (FRP=1). If yes, the facsimile processing is executed first at step S602. Then, the mail priority register MPR is checked to determine whether the priority of the mail processing is 2 (MPR=2) at step S603. If yes, then, the mail processing is executed at step S604 and next the printing processing is executed at step S605. If the priority of the mail processing is not 2 at step S603, it follows that the priority of the printing processing is 2. Therefore, in this case, after the printing processing has been executed (step S606), the mail processing is executed (step S607). If the priority of the facsimile processing is not 1 at step S601, it is determined at step S608 whether the priority of the mail processing is 1 (MPR=1). If yes, the mail processing is executed first at step S609. Then, at step S610, with the FAX priority register FPR checked, it is determined whether the priority of the facsimile processing is 2 (FPR=2). If yes, the facsimile processing is executed at step S611. Then, at step S612, the printing processing is executed. If the priority of the facsimile processing is not 2 at step S610, it follows that the priority of the printing processing is 2. Therefore, the printing processing is executed at step S613 and then the facsimile processing is executed at step S614. If the priority of the mail processing is not 1 at step S608, it follows that the priority of the printing processing is 1. Therefore, the printing processing is executed first at step S615. Then, at step S616, with the FAX priority register FPR checked, it is determined whether the priority of the facsimile processing is 2 (FPR=2). If yes, the facsimile processing is executed at step S617. Then, the mail processing is executed at step S618. If the priority of the facsimile processing is not 2 at step S616, it follows that the priority of the mail processing is 2. Accordingly, the mail processing is executed at step S619, and then the facsimile processing is executed at step S620. Because the order of the three processings is controlled according to the priority set in advance, it is possible to control the order of output according to an operator's desire.

Figure 15:
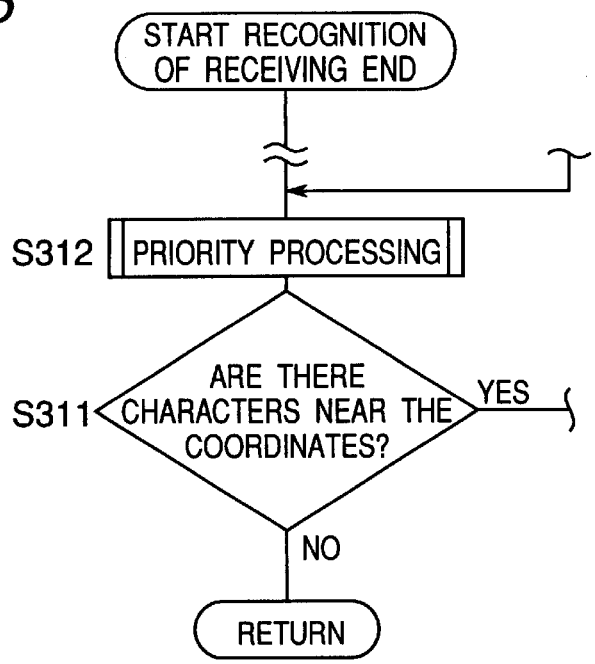
FIG. 15 shows a portion in which a priority processing is provided in the receiving department recognition processing of FIG. 8.
Figure 16:
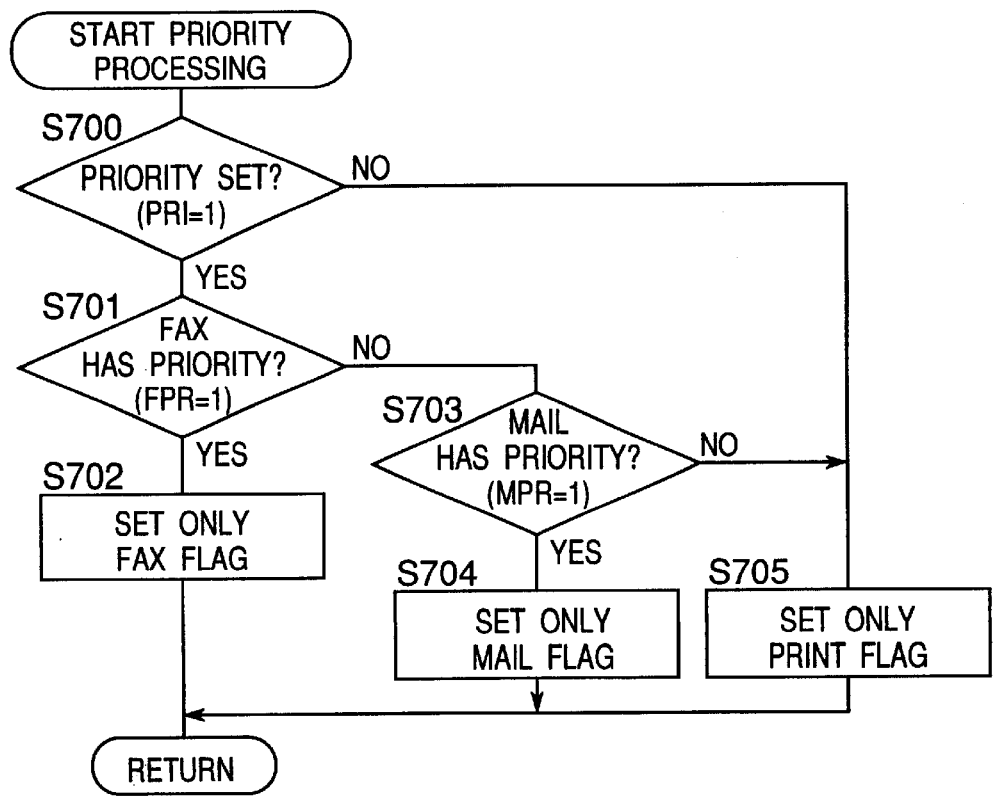
FIG. 16 shows the flow of the priority processing.

Further, it is possible to have the FAX priority register FPR, the mail priority register MPR, and the print priority register PPR for each receiver so that priorities among the facsimile processing, the mail processing, and the print processing are set for each receiver. For example, as shown in FIG. 15, immediately before step S311 in the receiving department recognition processing shown in FIG. 8, priority processing described below is executed (step S312). The priority processing uses a priority processing flag PRI indicating whether the operator has set priorities for the three processings through the operation panel B1, as shown in FIG. 16. Initially, at step S700, with the priority processing flag PRI checked, it is determined whether the operator has set priority among the three processings for a receiver through the operation panel B1. Then, at step S703, with the FAX priority register FPR checked, it is determined whether the priority of the facsimile processing is 1 (FPR=1). If yes, of the FAX flag, the mail flag, and the print flag (character string data change flag) for the receiver, only the FAX flag is set at step S702. If the priority of the facsimile processing is not 1, then the mail priority register MPR is checked and it is determined at step S703 whether the priority of the mail processing is 1 (FPR=1). If yes, of the FAX flag, the mail flag, and the print flag for the receiver, only the mail flag is set at step S704. If the priority of the mail processing is not 1, it follows that the priority of the printing processing is 1. Thus, of the FAX flag, the mail flag, and the print flag for the receiver, only the print flag is set at step S705. With this arrangement, a document can be sent to a receiver through one of the three output processings to which an operator has assigned a top priority. As a result, resources such as paper can be further saved.

It is possible to set priorities for the facsimile processing, the mail processing, and the print processing according to a default value stored in the memory. For example, regarding a receiver whose facsimile number and mail address are registered, the mail processing has a higher priority than the facsimile processing according to a default value. In this case, so long as the priority is not altered by input of an operator, the mail processing has priority over the facsimile processing. Alternatively, the facsimile processing may have a higher priority than the mail processing according to a default value. In this case, so long as the priority is not altered by input of an operator, the facsimile processing has priority over the mail processing.

The invention being thus described, it will be obvious that the same may be varied in many ways. For example, although the present invention is explained by referring a digital copier having data transmission function and thus the data regarding the document is in a form of image data, the present invention can be realized in a personal computer capable of sending an HTML data file to receivers through network line. In this case, the information regarding receivers may be included in the HTML data file in a form of text data. Such variations are not to be regarded as a departure from the spirit and scope of the invention, and all such conversions as would be obvious to one skilled in the art are intended to be included within the scope of the following claims.

What is claimed is:

1. An image processing apparatus comprising:
    a recognizer recognizing, by referring character strings included in original image data of a document, a plurality of receivers to which the document should be sent; and
    a data processor generating modified image data from the original image data, the modified image data being for a first receiver among the receivers and including character strings representing the receivers,
    wherein, in the modified image data, a display format of one of the character strings representing the first receiver is different from a display format of the character strings representing the remaining ones of the receivers.

2. The image processing apparatus according to claim 1, further comprising an output section outputting the modified image data to the first receiver.

3. The image processing apparatus according to claim 2, wherein the output section includes:
    a facsimile number storage storing a facsimile number of the first receiver, and
    a communication section dialing the facsimile number and thus sending the modified image data to the first receiver through a telephone line.

4. The image processing apparatus according to claim 2, wherein the output section includes:
    an address storage storing a network communication address of the first receiver; and
    a communication section addressing the network communication address and thus sending the modified image data to the first receiver through a network line.

5. The image processing apparatus according to claim 2, wherein the output section comprises different kinds of output devices, and these output devices have their respective preset priorities.

6. The image processing apparatus according to claim 5, wherein the priorities of the output devices are changeable for the first receiver.

7. A image processing apparatus comprising:
    a recognizer recognizing, by referring character strings included in original image data of a document, a plurality of receivers to which the document should be sent; and
    a data processor generating a plurality of sets of modified image data from the original image data, the plurality of sets of the modified image data being for the receivers, respectively, each set of the modified image data including character strings representing the receivers,
    wherein, in each set of the modified image data, a display format of one of the character strings representing the respective one of receivers is different from a display format of the character strings representing the remaining ones of the receivers.

8. The image processing apparatus according to claim 7, further comprising an output section outputting each set of the modified image data to the respective one of the receivers.

9. The image processing apparatus according to claim 8, wherein the output section includes:
    a facsimile number storage storing facsimile numbers of the receivers; and
    a communication section dialing the facsimile numbers and thus sending each set of the modified image data to the respective one of the receivers through a telephone line.

10. The image processing apparatus according to claim 8, wherein the output section includes:
    an address storage storing network communication addresses of the receivers; and
    a communication section addressing the network communication addresses and thus sending each of the modified image data to the respective one of the receivers through a network line.

11. The image processing apparatus according to claim 8, wherein the output section comprises different kinds of output devices, and these output devices have their respective priorities.

12. The image processing apparatus according to claim 11, wherein the priorities of the output devices are changeable for each receiver.

13. A data processing apparatus comprising:
- a data processing unit, by referring information included in original data of a document, a plurality of receivers to which the document should be sent, and generating modified data from the original data, the modified data being for a first receiver among the receivers, said modified data including first information representing the first receiver and second information representing the remaining ones of receivers, wherein a display format of the first information is different from a display format of the second information.

14. The data processing apparatus according to claim 13, further comprising an output section outputting the modified data to the first receiver.

15. The data processing apparatus according to claim 14, wherein the output section includes:
- an address storage storing a network communication address of the first receiver; and
- a communication section addressing the network communication address and thus sending the modified data to the first receiver through a network line.

* * * * *